May 1, 1962 H. E. WHITING 3,032,619
MOTOR STARTER MOUNTING
Filed May 23, 1960 2 Sheets-Sheet 2

INVENTOR.
Harold E. Whiting,
BY John H. Leonard,
his ATTORNEY.

United States Patent Office 3,032,619
Patented May 1, 1962

3,032,619
MOTOR STARTER MOUNTING
Harold E. Whiting, Milwaukee, Wis., assignor to Square D Company, Detroit, Mich., a corporation of Michigan
Filed May 23, 1960, Ser. No. 31,100
3 Claims. (Cl. 200—50)

This invention relates to a motor starter and mounting combination, and more particularly to a type of mounting wherein a pair of motor starters may be mounted in back-to-back relation and supported in said relation on a panel in spaced relation to a face of the panel at the same side of the panel with a coacting interlock operative to actuate the starters in a predetermined relation to each other.

In many electrical panelboard installations, mounting space for the various instruments and mechanisms on the panelboards is at a premium. Accordingly, it is mandatory that bulky apparatus, such as a plurality of motor starters, be mounted in as small a space as possible in a manner such that the starters are easily accessible for repairs.

When a pair of motor starters is mounted in adjacent coacting relation, it is often desirable, in many applications, to have the actuating mechanisms of such starters connected with an interlock system which controls the switch mechanisms of such starters in a predetermined manner.

It is an object of the present invention to provide a motor starter mounting wherein a pair of motor starters may be mounted in back-to-back relation on a panelboard at the same face of the board while rendered easily accessible for service and repair of the starters.

A further object of the invention is to provide a motor starter mounting of the aforedescribed type wherein the motor starters, while mounted thereon in back-to-back relation, are interconnected with a coacting interlock device which permits simultaneous operation of the starters and requires opening of one starter before closure of the other starter can commence.

Briefly, the foregoing objects are accomplished by a motor starter mounting comprising a pair of complementary right and left hand mounting brackets in the form of plates disposed in spaced face-to-face relation to each other and having oppositely disposed coacting inturned flanges at their free or forward edges, the flanges being adapted for connection to a first motor starter for supporting the starter between the inner faces of the plates, and for connection to a second motor starter for supporting the second starter forwardly of the forward edges of the plates, whereby the starters are supported by the plates in back-to-back relation.

The mounting plates are provided also with coacting inturned oppositely disposed mounting flanges at the rear or panel edges of the plates by which the plates, with a pair of starters supported thereby, may be mounted as a unit on one face of a panelboard in a very small and confined space.

Additionally, a suitable interlock mechanism is provided on one of the mounting plates so as to extend alongside the plate forwardly and rearwardly thereof. Such interlock mechanism includes actuating arms having their outer end portions secured to the respective actuating mechanisms of the starters in a manner whereby such interlock requires opening of a closed starter before the other starter can be closed.

Other objects and advantages of the invention will become apparent from the following description, taken in conjunction with the drawings, wherein.

Figure 2:
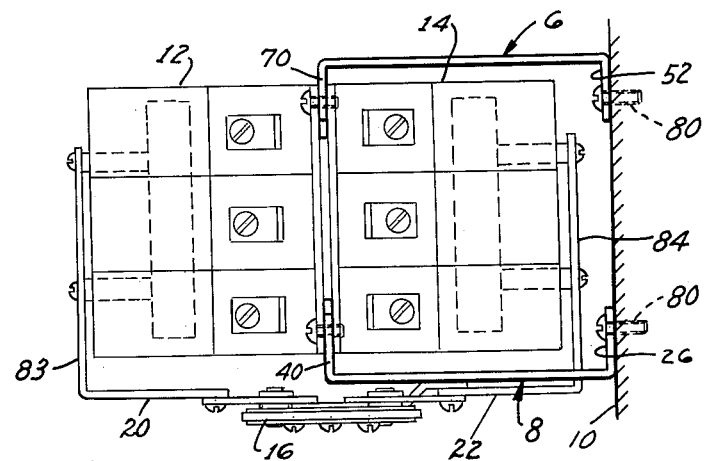
FIG. 2 is a top plan view of the apparatus shown in FIG. 1.

Referring to the drawings, there is shown a dual motor starter mounting apparatus including the coacting left and right mounting plates or brackets 6 and 8, respectively, which are mounted on the vertical panelboard 10 in side-by-side spaced relation.

A pair of conventional motor starters 12 and 14 are mounted on the plates in back-to-back relation, such mounting arrangement to be hereinafter described. The specific operational and structural details of the motor starters are not described herein, since the same form no part of the present invention.

A motor starter switch interlock mechanism 16 is mounted on the bracket 8 and contains actuating arms 20 and 22 which are secured to the vertically movable switch-actuating portions or mechanisms (not shown) of the respective starters 12 and 14. The interlock mechanism 16 funcions to prevent simultaneous operation of the starters by requiring substantially complete opening of one starter before closure of the other starter can commence. Specific operational and structural details of the interlock 16 are set forth in U.S. Patent No. 2,612,789 of Joseph Bierenfeld, issued October 7, 1952, and are not described herein since the same forms no part of the present invention.

The right mounting bracket 8 comprises a planular vertically-elongated base or plate portion 24 having an upper inturned mounting flange 26 and a lower inturned mounting flange 28, such flanges being formed from the inner or panel edge 30 of the base portion 24. The flange 26 has a centrally disposed keyhole configured aperture 32, and the flange 28 has an aperture or slot 34 formed at its lower end, such aperture and slot adapted to receive a stud or bolt, or the like, by means of which the bracket is mounted to the panel 10. The bracket 8 includes also upper and lower starter mounting flanges 40 and 42, respectively, which are formed from the outer or free edge 44 of the bracket.

The left mounting bracket 6 is of similar construction and comprises a vertically elongated base or plate portion 50 having an upper inturned mounting flange 52 and a lower inturned mounting flange 54, such flanges being formed from the inner or panel edge 60 of the base portion 50. The flange 52 has a centrally disposed keyhole configured aperture 62, and the flange 54 has an aperture or slot 64 formed at its lower end, such aperture and slot being adapted to receive a stud or bolt, or the like, by means of which the bracket is mounted to the panel 10, as shown. The bracket 6 includes also upper and lower starter mounting flanges 70 and 72, respectively, which are formed from the outer or free edge 74 of the bracket.

Figure 1:
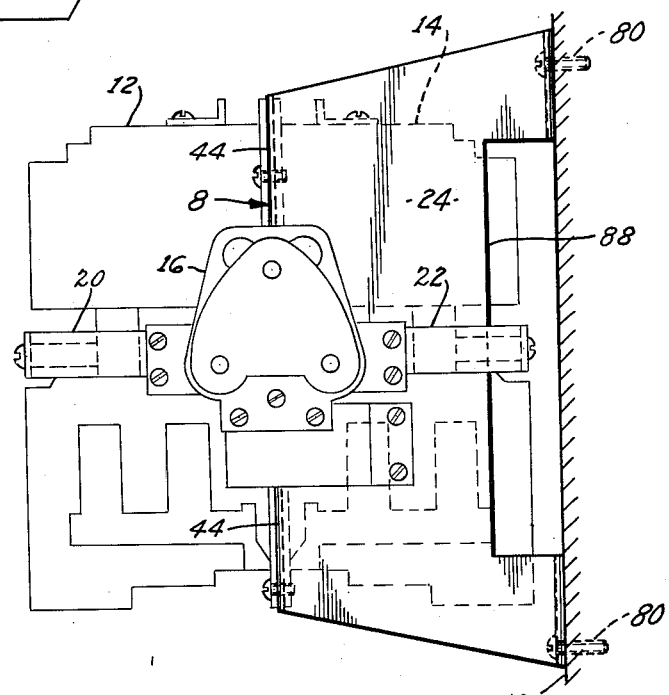
FIG. 1 is a side elevational view of a mounting bracket of the invention and showing in outline a pair of motor starters mounted on such mounting brackets in back-to-back relation, and showing an interlock mechanism connected to such starters in accordance with the invention.
Figure 5:
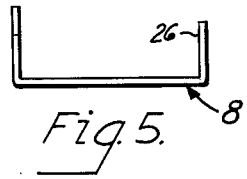
FIG. 5 is a top plan view of the bracket shown in FIG. 3.
Figure 3:
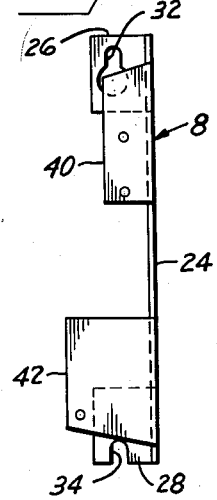
FIG. 3 is a front elevational view of the right mounting bracket shown in FIG. 2.
Figure 4:
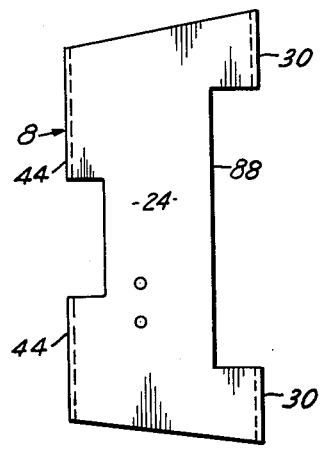
FIG. 4 is a side elevational view of the bracket shown in FIG. 3.
Figure 8:
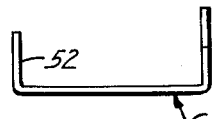
FIG. 8 is a top plan view of the bracket shown in FIG. 6.
Figure 7:
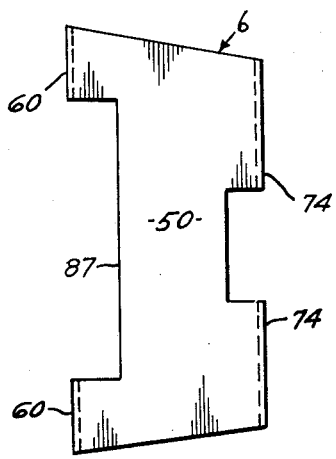
FIG. 7 is a side elevational view of the bracket shown in FIG. 6.
Figure 6:
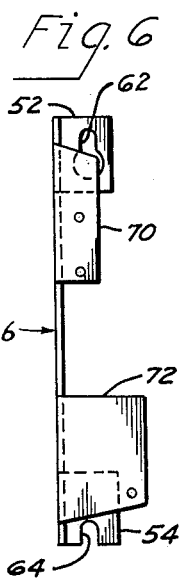
FIG. 6 is a front elevational view of the left mounting bracket shown in FIG. 2.

In practice, the brackets 6 and 8 are mounted in spaced parallel relation to each other on one face of the panel 10 by the bolts or studs 80 which pass through apertures in the respective mounting flanges of the plates, as shown in FIGS. 1 and 2.

The starters 12 and 14 are then mounted on the starter mounting flanges 40, 42, 70 and 72, respectively, in back-to-back relation, whereby the backs of the starters have aligned portions bolted to the respective flanges such that the starter 12 is disposed exteriorly forwardly of the brackets and faces forwardly thereof, and the starter 14 is disposed interiorly between the brackets and faces rearwardly thereof, all in spaced relation to the adjacent front face of the panel 10, as shown, with the backs of the starters extending generally parallel to the panel face.

The switch actuating arms 20 and 22 have outer portions 83 and 84, respectively, which are bent transversely of the planes of the brackets, toward the starter, at substantially a right angle to said planes, and pass through the cut-away or offset portions 87 and 88 of the brackets 6 and 8, respectively. These outer portions 83 and 84 are secured to vertically reciprocable actuating mechanisms of the respective starters.

The arms 20 and 22 move a portion of the interlock 16 about axes extending normal to the side face of the bracket 8. The interlock action is such that the switch actuating mechanism of one starter cannot be closed until the switch actuating mechanism of the other starter is substantially opened.

As best shown in FIG. 2, the aforedescribed bracket construction provides adequate accessibility to the top and bottom of the starters for purposes of repair and maintenance.

Having thus described my invention, I claim:

1. A motor starter and mounting combination for mounting a pair of motor starters on a panel and comprising a panel, bracket means connected to the panel and to the starters and supporting the starters in back-to-back relationship to each other and in spaced relation to the face of the panel at the same side of the panel with the backs of the starters extending generally parallel to the panel face, interlocking means carried by the bracket means alongside the starters and connected to the starters and constraining each to move to an open position before the other moves to a closed position and vice versa.

2. The combination of claim 1 wherein the interlocking means includes arms respective to and extending alongside of the side face of the bracket means and mounted on the starters at their opposed end portions, for moving portions of the interlock means about axes extending normal to said side face.

3. A motor starter and mounting combination for supporting two motor starters in back-to-back relation to each other and in spaced relation to a face of a supporting panel with the backs of the starters extending generally parallel to the panel face, and comprising matching left and right hand brackets each having a side wall and inturned flanges at the forward and rearward edges of the side wall, said brackets being arranged with their side walls in parallel spaced face-to-face relation to each other and in alignment with each other in a direction normal to said walls, and with the flanges of said front edges of each bracket extending from its side wall toward the other bracket, a pair of motor starters, each starter having a back and a front, said starters being arranged in back-to-back spaced relation with said front edge flanges between their backs, means for bolting aligned portions of the backs and flanges together, and means on the flanges at the rear edge for securing the brackets to a panel.

References Cited in the file of this patent

UNITED STATES PATENTS

| | | |
|---|---|---|
| 2,428,320 | Platz | Sept. 30, 1947 |
| 2,612,789 | Bierenfeld | Oct. 7, 1952 |